United States Patent [19]

Entzmann

[11] 3,972,724

[45] Aug. 3, 1976

[54] PROCESS OF BURNING FUEL SLATE TO PRODUCE ENERGY AND CEMENT CLINKER AT THE SAME TIME

[76] Inventor: Karl Entzmann, 10, Eichbergstrasse, A-2371 Hinterbruhl, Austria

[22] Filed: Mar. 24, 1975

[21] Appl. No.: 561,218

[30] Foreign Application Priority Data

Mar. 25, 1974 Austria .................................. 2440/74

[52] U.S. Cl. ................................. 106/103; 122/7 R
[51] Int. Cl.² ............................................ C04B 7/32
[58] Field of Search ............................ 106/100, 103

[56] References Cited
UNITED STATES PATENTS

| | | | |
|---|---|---|---|
| 1,536,165 | 5/1925 | Tetens .................................. | 106/100 |
| 2,904,445 | 9/1959 | Sellers et al. ......................... | 106/100 |
| 2,991,187 | 7/1961 | Sellers et al. ......................... | 106/100 |
| 3,127,455 | 3/1964 | Culbertson et al. .................. | 106/100 |

Primary Examiner—J. Poer
Attorney, Agent, or Firm—Imirie, Smiley & Linn

[57] ABSTRACT

In a method of processing fuel shale to produce energy and cement clinker at the same time, oil shale and/or coal shale are disintegrated, homogenized and activated in a pin beater mill or vibrating mill. The effect of the treatment is monitored by X-ray microanalysis and the treatment is automatically controlled. The admixtures required for the production of a cement having the desired quality are added simultaneously at controlled rates. The thus treated material is then burnt in a boiler plant, preferably at combustion temperatures up to 1400°C and with simultaneous sintering, whereby ash and/or slag is formed which contains at least 60% cement clinker. Said cement clinker is separated from the residual ash and slag and in an impact-type mill is disintegrated in such a manner that each clinker particle is subjected to 3–8 impacts within a time of preferably less than 0.01 second by beating elements which are moved at a velocity of at least 15 meters per second, preferably at a velocity between 50 meters and 250 meters per second.

8 Claims, 1 Drawing Figure

U.S. Patent   Aug. 3, 1976   3,972,724
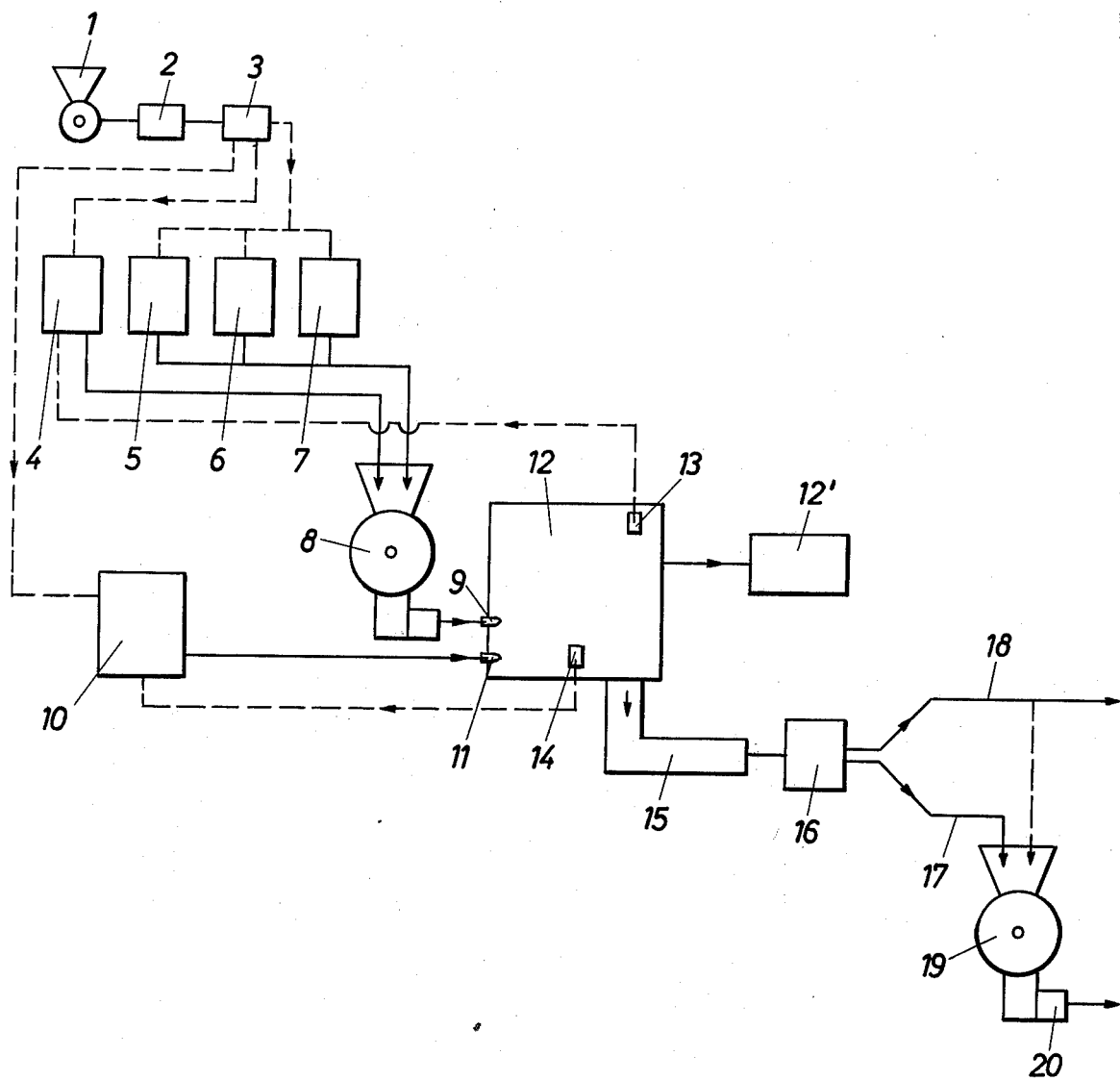

PROCESS OF BURNING FUEL SLATE TO PRODUCE ENERGY AND CEMENT CLINKER AT THE SAME TIME

SUMMARY OF THE INVENTION

In a method of processing fuel shale to produce energy and cement clinker at the same time, oil shale and/or coal shale is disintegrated, homogenized, and activated in a pin beater mill or a vibrating mill. The effect of the treatment is monitored by X-ray microanalysis and the treatment is automatically controlled. The admixtures required for the production of a cement having the desired quality are added simultaneously at controlled rates. The resulting material is then burnt in a boiler plant. The cement clinker, which is present in a content of at least 60% combustion residue, is separated from the ash and/or slag and is disintegrated in a disintegrator.

This invention relates to a process of burning fuel shale to produce energy and cement clinker simultaneously.

It is known that disintegrated combustible materials having a high mineral content, particularly oil shale or coal shale, can be burnt in particularly designed boiler plants to produce heat and/or electric power. In the design of these boiler plants, special consideration must be given to the properties of the fuel, such as a lower heat load transfer rate per unit of area and the need for a mechanical cleaning to remove the materials which tend to deposit, e.g., lime, clay, etc.

Whereas the fuel shale can be disintegrated to the small particle size which is required in grinding units, particularly ball mills, these do not sufficiently change the structure of the material. The ash and slag which are obtained after the combustion give rise to severe problems regarding ecological pollution because dry ash is blown off by the wind unless the ash dumps are continually moistened and because they may contaminate the underground water.

Various processes are known which enable a utilization of the combustion residue. For instance, when suitable admixtures are added, the combustion residue may be processed to products such as cement, alumina, metals, artificial stone, etc..

The combustion residue may also be cooled and then used as admixtures in the cement industry, in road making or as starting material for building materials. In the latter case the starting material is further disintegrated, homogenized and activated in a pin beater mill and is moistened at the same time or subsequently. The material is then shaped and thereafter subjected to hydrothermal drying. Such process has been described, e.g., in the Austrian Patent Specification 295,381.

The physical foundations of the present invention are found in mechanochemistry (tribomechanics). This is a relatively new branch of science and is concerned in the widest sense with the chemical and physicochemical changes which are induced in solids under the action of mechanical energy. An important cause of the change of the behaviour of a material is the change of its lattice structure, primarily the formation of disordered portions. These changes in structure induce an activation of the solid, i.e., an acceleration of the chemical and physicochemical processes which take place on the solid. The degree of activation depends on the structure of the solid which is subjected to mechanochemical processing and on the intensity and nature of the mechanical forces to which it is subjected.

Where periodically acting forces are exerted, the intensity of the treatment depends on the amplitude and frequency of the energy which is applied. It has been found, e.g., that when particulate material to be activated is passed through a pin beater mill (disintegrator), the particles are subjected to repeated accelerations and retardations within a fraction of a second by the pins carried by the rotor. The mechanical energy which is applied within said short time to the particles to be activated is larger than the mechanical energy which is applied to said particles during a treatment for several hours in a ball mill or in a vibrating mill, although the latter has a much higher efficiency than a ball mill.

In experiments to disintegrate KCl + KBr in a pin beater mill, e.g., it has been found that this results in a formation of KCl.KBr mixed crystals, which are not formed by a treatment in a vibrating mill although the latter may also be used for activation. It is thus apparent that the highest activation efficiency can be obtained at this time by a disintegration in a pin beater mill.

The physical and physicochemical operation is performed in that each particle of the mixture is subjected to 3–8 impacts within less than 0.05 second, preferably less than 0.01 second, by beater pins moved at a velocity of at least 15 meters per second and preferably at a velocity between 50 meters and 250 meters per second. During such treatment of the mixture, the same is not disintegrated by attrition but each particle of the material to be disintegrated is cleaved along its weakest lattice plane so that the activated state described above is obtained.

It has also been found that the mixtures can be sintered at a lower temperature when the components have been activated before although the temperature rise results in a healing of the lattice defects, i.e., in deactivation. Experiments have shown that the sintering behavior of material which has been mechanochemically activated can be explained by microstructural changes, such as a decrease of the size of the primary particles, partly opposing functions of lattice distortions and lattice defects.

The strength of cement, e.g., can also be much increased by the activating grinding described above.

Tribochemical disintegrating and activating processes of the kind described hereinbefore are already known and have been described, e.g., by W. Hinz in "Silikate", Vol. 2, pages 375 and 376.

The investigations which have resulted in the present invention have shown that such process can afford special and surprising advantages when applied to the treatment of specific materials, namely, cement clinker which has been produed by a combustion of shale.

The above-described advantages of the tribochemical process are afforded particularly when this process is applied in accordance with the invention to the material which has been mentioned above.

It is an object of the invention to apply tribochemical processing, i.e, mechanochemical activation, of raw materials by means of impact-type mills, to cement clinker which has been produced in a process in which fuel shale and, if desired, admixtures, is or are disintegrated and the fule shale is then burnt in a combustion plant, preferably a steam boiler plant, preferably at combustion temperatures up to 1400°C, whereby a combustion residue is obtained which in addition to ash and slag contains cement clinker in an amount of at least 60% of the total combustion residue.

The process according to the invention will produce optimum results if the cement clinker has been separated from the ash and slag also produced by the combustion of the fuel shale and is disintegrated in an impact-type mill in which each clinker particle is subjected within preferably less than 0.01 second to 3 to 8 impacts by beating elements which move at a velocity of at least 15 meters per second, preferably 50–250 meters per second.

The invention will now be explained more fully with reference to the drawing, which is a diagrammatic view showing a power plant in which oil shale is burnt to produce steam and high-grade cement is produced from the combustion residue.

The drawing shows a laboratory disintegrator 1, which serves to pulverize small quantities of oil shale which is to be burnt. This disintegrator 1 is succeeded by an X-ray microanalyzer 2 for analyzing the disintegrated oil shale and an electronic data-processing system 3. Storage bins for oil shale, $SiO_2$, $CaO$, and $R_2O_3$ are designated 4, 5, 6, and 7. The oil shale which has been analyzed is fed into bin 4. The data resulting from the analysis are stored in the data-processing system.

These four bins are succeeded by a disintegrator 8, which supplies a highly fine-grained mixture of oil shale and admixtures to the oil shale nozzle 9 of the steam boiler 12. There is also a fuel oil storage tank 10, which feeds the auxiliary oil burner 11 of the boiler.

The boiler has a steam pressure sensor 13 and a temperature sensor 14, which is arranged in the combustion chamber. The steam pressure sensor 13 is connected to the oil shale bin 4. The temperature sensor 14 is connected to the oil storage tank 10. The bin 4 and the tank 10 are operatively connected to the electronic data-processing system 3. All these operative connections are indicated by a dotted line in the drawing.

The boiler furnace is provided with an ash-discharge system 15, which supplies a separator 16. The latter may consist of an air separator or a centrifuge. Materials-handling lines 17 and 18 which preferably include belt conveyors succeed the separator 16. The materials-handling line 18 carries off ash and slag contained in the combustion residue for further utilization. Cement clinker which in the separator 16 has been separated from the other constituents of the combustion residue is carried by the materials-handling line 17 to a disintegrator 19, which is provided according to the invention and has a discharge system 20.

This plant has the following mode of operation:

A small quantity of the oil shale which has been supplied and is to be burnt in the boiler plant is disintegrated in the laboratory disintegrator 1 and is then supplied to the X-ray microanalyzer 2, where the structure of the oil shale is analyzed. The results of this analysis are fed to the data-processing system 3. The latter controls the rates at which oil shale from the bin 4 and, if desired, admixtures from the bins 5, 6, 7 are fed to the disintegrator 8 and then to the boiler furnace and also the rate at which oil used as auxiliary fuel must be fed to the oil burner to maintain the prescribed minimum heat production rate which is required for the furnace. It is apparent that the data-processing system must determine the rate at which oil is required as an auxiliary fuel. The latter rate will depend on the heating value of the oil shale which has been supplied.

The data-processing plant must also determine the rates at which admixtures are added. The latter rates will depend on the also varying composition of the mineral components of the oil shale.

The controlled rates of oil shale and oil will also depend on the instantaneous state of the boiler, i.e., the steam pressure and the combustion chamber temperature.

The steam which has been produced in the boiler is used to operate steam tubogenerators 12'.

The combustion residue coming from the combustion chamber contains ash and slag and mainly consists in an amount of about 60–75% by weight of cement clinker. The combustion residue is cooled in the discharge system 15 and is fed immediately thereafter to the separator 16.

In the latter, the much heavier cement clinker is separated from the lighter ash and slag constituents by centrifuging or in an air stream in an air separator.

The ash and slag constituents of the combustion residue is carried off by the materials-handling line 18 for any desired, further utilization. This is not explained more fully because it is no part of the invention.

By means of the materials-handling line 17, the cement clinker is fed to the disintegrator 19, which in accordance with the invention is provided at this point of the production line. In the disintegrator 19, the cement clinker is subjected to impact-type disintegration, whereby a cement powder is formed, which is carried by a discharge system 20 to a bag-filling and closing plant, not shown, or directly to a plant for making concrete.

The disintegration in the disintegrator activates the cement powder so that the concrete in which the cement powder is incorporated has a much higher crushing strength. An example of the process according to the invention, carried out in a plant of the kind just described, will now be described.

Oil shale which contains 47.63% combustible constituents and 52.37% ash and which has a lower heating value of 2500 kcal/kg is to be burnt in the furnace of a steam boiler for a 200-megawatt power plant, which requires 650 tons per hour. A grade PZ 275 cement, i.e., a Portland cement having in the cured state a crushing strength of 275 kp/cm², should be produced from the combustion residues.

About 630 kcal are required to produce 1 kg of steam. Assuming that the boiler plant has an efficiency of 88%, this results in a heat requirement of $$65{,}000 \times 630 \ \frac{100}{88} = 465.3 \ \text{Gcal/h}$$

For this reason, oil shale having the lower heating value of 2500 kcal/kg assumed above is required at a rate of $$\frac{465.3 \ \text{Gcal/h}}{2500 \ \text{kcal/kg}} = 186.1 \ \text{metric ton per hour.}$$

In view of the mineralogic composition of the oil shale, admixtures in an amount of 13.63% of the weight of the oil shale were added to the latter to enable the production of a cement having the desired quality. These admixtures consisted of $SiO_2$, $CaO$, and $R_2O_3$. As a result of the addition of these incombustible admixtures, the mixture of oil shale admixtures to be fed to the furnace had a heating value of only 1784 kcal/kg so that additional heat was required at a rate of 2500 − 1784 = 716 kcal/h. Heat at this rate was produced by an additional combustion of fuel oil having a lower heating value of 9500 kcal/kg. The oil requirement was thus $$\frac{716 \text{ kcal/kg}}{9500 \text{ kcal/kg}} = 0.075 \text{ kg oil per kg oil shale,}$$

corresponding to about 14 metric tons of fuel oil per hour.

The rates at which oil shale and fuel oil were supplied to the furnace were controlled in dependence on the steam pressure and combustion chamber temperature.

The combustion residue discharged from the furnace was cooled without using water. The cooled combustion residue was subjected to centrifugal separation to separate the clinker minerals (ash and slag) from the other components (ash and slag) of the combustion residue. Because the clinker has a much higher specific gravity than all other components of the combustion residue, it can be separated with high efficiency. The combustion residue contained about 62.5% clinker minerals, based on the total weight of the combustion residue. The clinker which had thus been recovered was disintegrated and thus activated in a disintegrator, in which each particle size of the clinker was subjected in intervals of time of less than 0.05 second to three to eight impacts by the beater pins on the drum of the disintegrator. These pins move at a velocity (peripheral velocity) in excess of 15 meters per second. As a result, the individual clinker particles are not subjected to attrition but are cleaved along lattice planes of the space lattice so that the activation results.

The resulting cement had in the fully cured state a strength of 384 kg/cm² and more and was thus much stronger than cement which had been obtained by a mere grinding of clinker produced in the same manner.

The ash and slag constituents separated from the clinker were utilized in accordance with Austrian Patent Specification 295,381. For this purpose they were further disintegrated and were moistened and then charged into molds, e.g., for the manufacture of building stones. The moldings were then subjected to hydraulic-thermal drying. Alternatively, the ash and slag constituents could be used as admixtures in the making of cement.

If an oil shale having a different mineralogical composition was used so that a different proportion of admixtures was required, a combustion residue could be produced which contained somewhat more than 70% clinker minerals. In such cases it is not necessary to separate the clinker from the other components of the combustion residue and the entire combustion residue can be cooled and then supplied to the disintegrator. It will be understood that the resulting cement has a lower crushing strength than cement made from pure clinker, which is free of ash, but even this crushing strength is higher than that of a cement made from the same starting material when the clinker is merely ground rather than disintegrated by an impact treatment in a disintegrator.

What is claimed is:

1. A method of processing fuel shale to produce energy and cement clinker therefrom, comprising the steps of:
   a. subjecting the dry fuel shale to mechanical disintegration in a pin-type disintegrator in which the particles formed are subjected to repeated acceleration and retardation within a period of less than about 0.05 second, thereby homogenizing and activating at least a part of said shale;
   b. admixing with the disintegrated shale finely divided $SiO_2$, $CaO$ and $R_2O_3$ in an amount sufficient to form upon sintering a combustion residue consisting essentially of at least about 60% by weight of cement clinker, the remainder ash and slag;
   c. subjecting said fuel shale mixture to further mechanical disintegration in a pin-type disintegrator as in step (a);
   d. combusting and sintering said disintegrated shale mixture in a furnace to generate heat and to produce said combustion residue;
   e. mechanically separating said cement clinker from said ash and slag and recovering the clinker; and
   f. subjecting said cement clinker to impact-type disintegration to produce a cement powder.

2. The method of claim 1 in which said fuel shale mixture is combusted in a steam boiler plant at a combustion temperature up to about 1400°C.

3. The method of claim 1 in which said cement clinker formed in step (d) is disintegrated in said impact-type disintegrator in such manner that each clinker particle is subjected to 3 to 8 impacts within less than 0.01 second by beating elements which move at a velocity of at least 15 meters per second.

4. The method of claim 1 in which said recovered cement clinker is admixed with a portion of said ash and slag of the combustion residue to produce a cement composition.

5. The method of claim 1 in which an auxiliary combustion means is operated in the furnace to raise the combustion temperature to the level required for production of cement clinker.

6. The method of claim 1 in which the shale mixture is sintered in the furnace in step (d) under the action of heat produced only by burners for liquid fuel fed to said furnace.

7. The method of claim 1 in which said cement clinker is separated from said combustion residue before the clinker is disintegrated in said impact-type disintegrator.

8. The method of claim 1 in which the degree of mechanical disintegration in step (a) is controlled in response to monitoring of the structure of the disintegrated shale by x-ray micro-analysis.

* * * * *